June 14, 1932.  F. A. FLEISCHMANN ET AL  1,863,440
CLUTCH SHIFTING MECHANISM FOR DYNAMOMETER CARS
Filed July 24, 1930  3 Sheets-Sheet 1
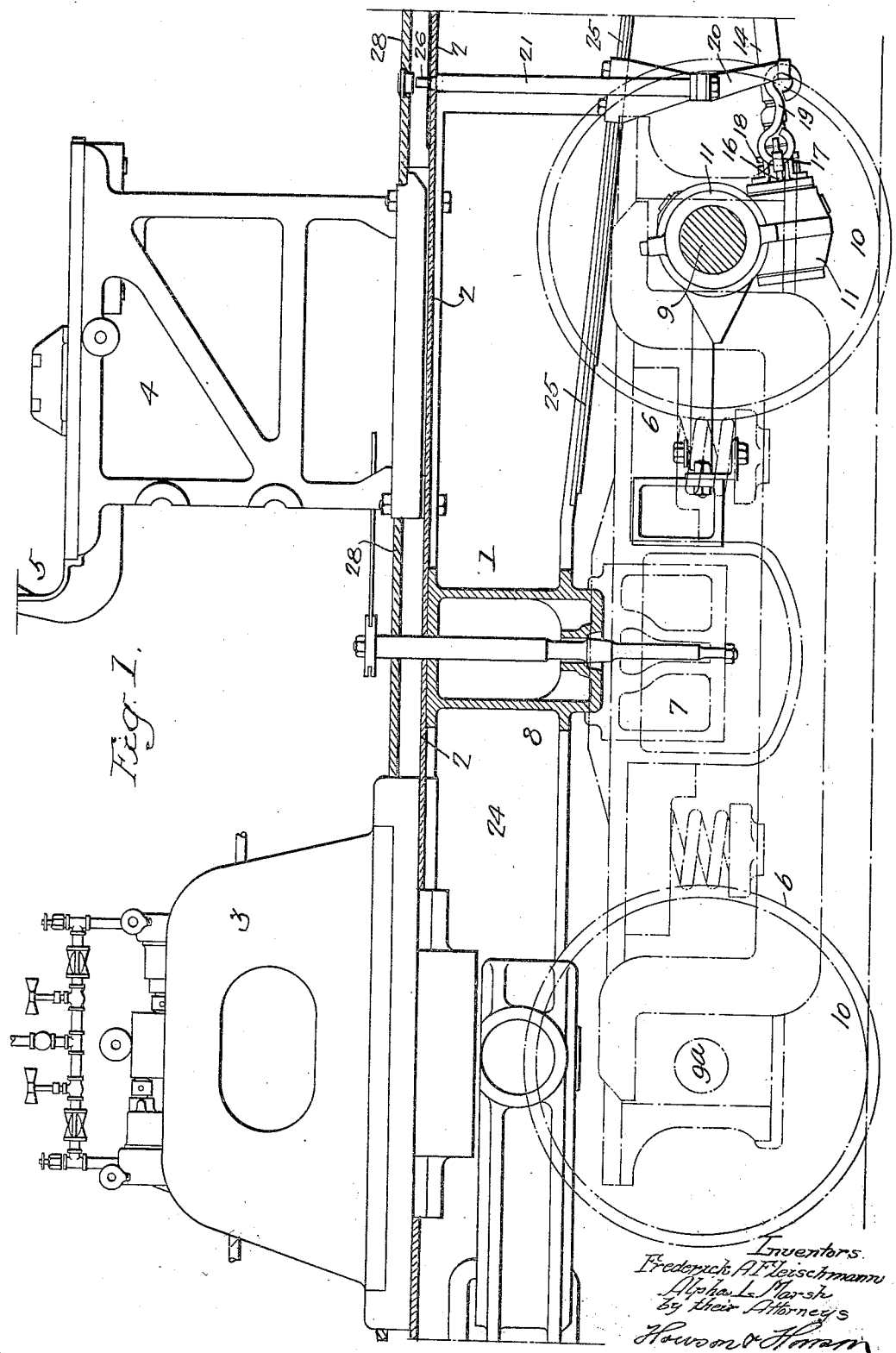

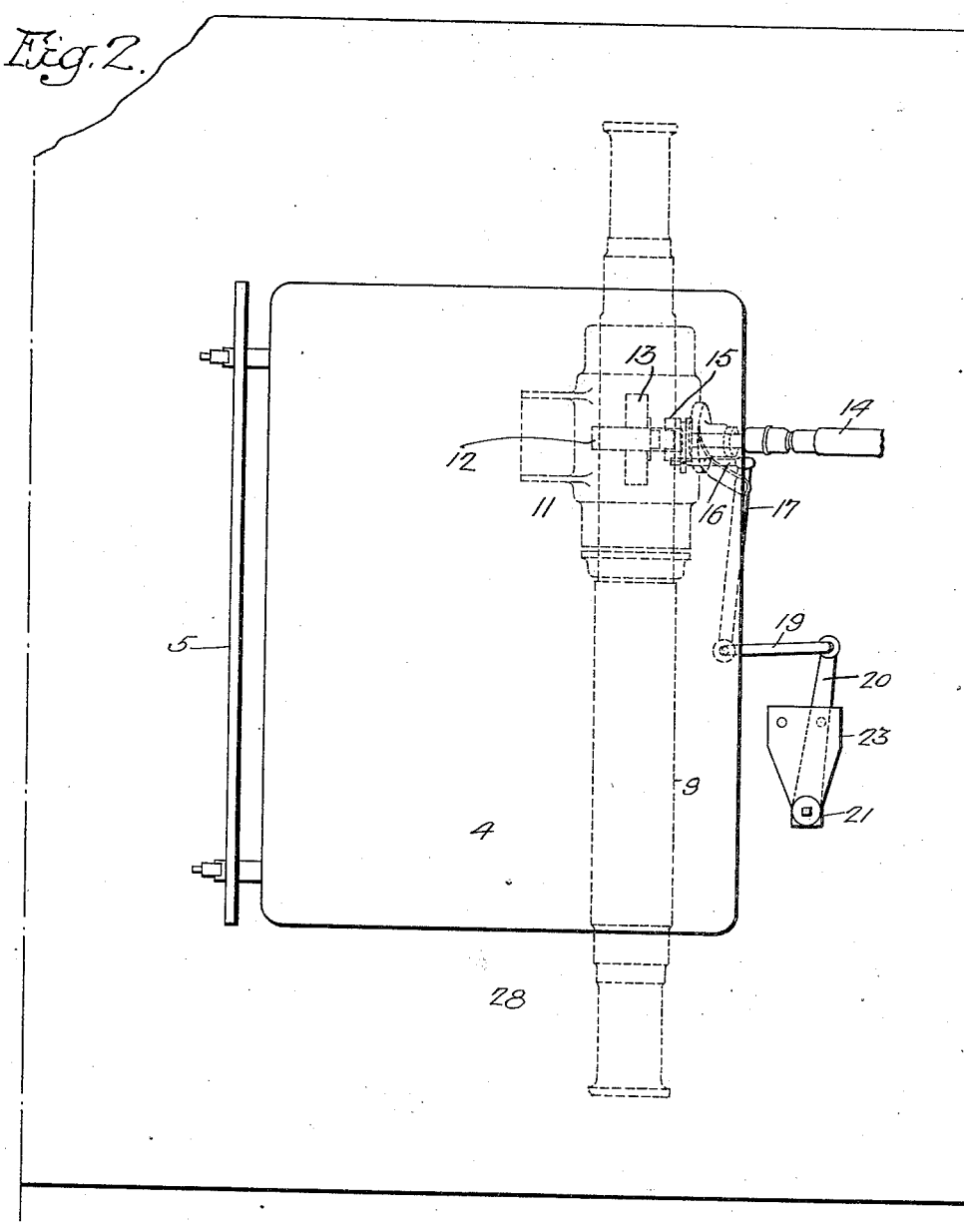

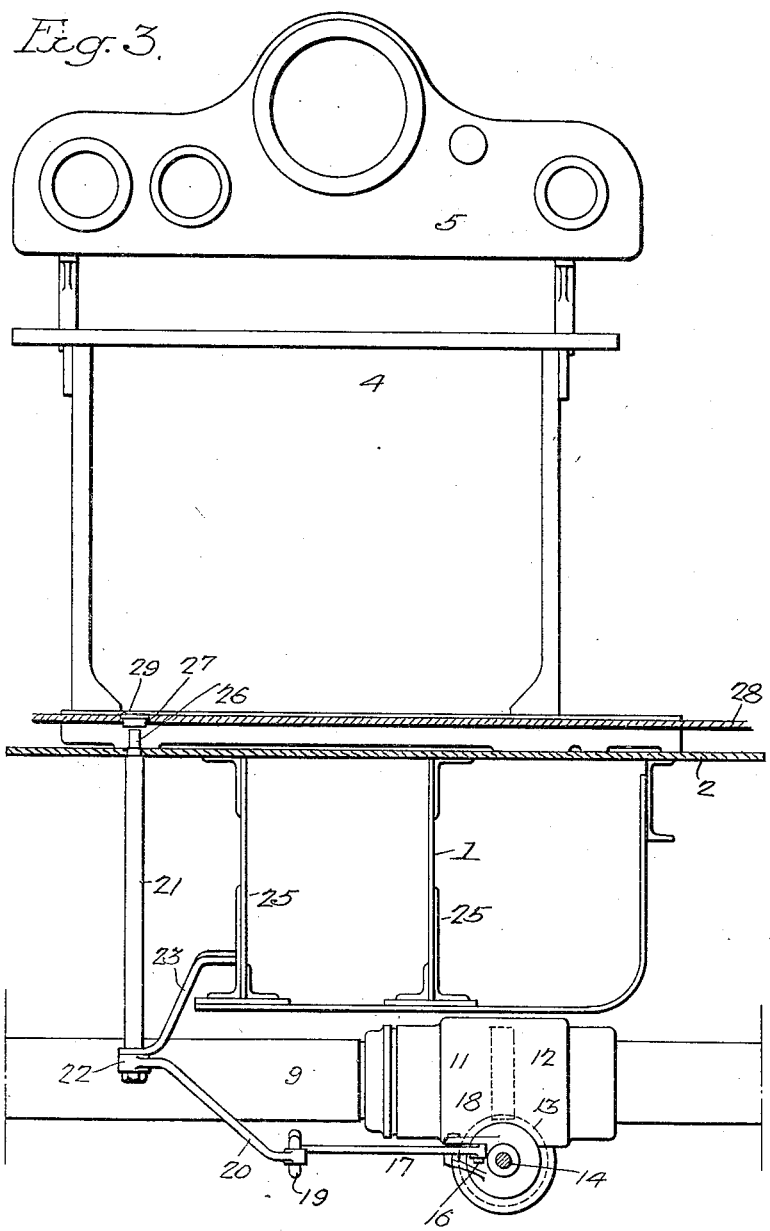

Patented June 14, 1932

1,863,440

UNITED STATES PATENT OFFICE

FREDERICK A. FLEISCHMANN, OF DREXEL HILL, AND ALPHA L. MARSH, OF PHILADELPHIA, PENNSYLVANIA

CLUTCH SHIFTING MECHANISM FOR DYNAMOMETER CARS

Application filed July 24, 1930. Serial No. 470,419.

Our invention relates to certain improvements in the clutch shifting mechanism of dynamometer cars used upon railroads.

The invention is suitable for cars having either four-wheeled or six-wheeled trucks.

The object of the invention is to so construct the clutch control mechanism that the movement of the car truck in any direction will not affect the position of the clutch shifter in the axle drive gear case.

In the accompanying drawings:

Figure 1 is a side view of sufficient of a dynamometer car to illustrate our invention, the truck being in dotted lines;

Fig. 2 is a plan view;

Fig. 3 is a transverse sectional elevation of sufficient of the mechanism to illustrate the invention; and Fig. 4 is an enlarged sectional view of part of Fig. 1.

1 is the frame of a dynamometer car on which is mounted the weighing head 3 and the dynamometer table 4 over which the recording paper travels. On the table is an indicator panel 5. The weighing head and the table are mounted on the floor plate 2 of the car. A four-wheel truck 6 is pivotally mounted under the frame of the car and has a bolster 7 which is located under the car bolster 8 and pivoted thereto in the usual manner. 9—9a are the axles of the truck and 10—10 are the wheels which are mounted on the axles. The axle 9 in the present instance is the driving axle for the mechanism of the dynamometer car, and on this axle is a casing 11 which encloses a worm or gear wheel 12 secured to the axle, which meshes with the gear wheel 13 securely mounted on the driven shaft 14 which is connected to the dynamometer mechanism. On the gear wheel 13 is a clutch face, and mounted on the shaft 14 is a movable clutch 15 of any suitable type, which in the present instance is shifted into and out of position by a rod 16. This rod is connected to a lever 17, which is pivotally mounted on a bracket 18 projecting from the casing 11. The long arm of the lever 17 extends preferably to or beyond the longitudinal center line of the car. A vertical operating shaft 21 has its upper bearing in the plate 2 and its lower bearing 22 is at the end of a bracket 23 secured to one of the beams of the frame 1. The long arm of the lever 17 is connected by a link 19 to an arm 20, which is secured to the lower end of the vertical operating shaft 21. By locating the clutch mechanism on the truck at one side of the longitudinal center line of the car, and locating the vertical operating shaft on the opposite side of said center line, the connections can be made as above stated, so that the clutch can be operated no matter in what position the truck is in in respect to the main frame of the car.

The frame in the present instance is made of girders 25 of any suitable type connected to the cast metal end members 24 of the car frame as shown in Fig. 1, but the type of frame may be modified without departing from the essential features of the invention. On the upper end of the vertical operating shaft 21 is a rectangular head 26 in the present instance, which extends to a point under an opening 27 in the floor 28 of the car. This opening in the floor 28 is closed by a cap 29, Fig. 4, which covers and protects the end of the operating shaft 21. On removing the cap and applying a clutch-control handle, the shaft can be turned to operate the clutch within the casing 11.

We claim:

The combination in a dynamometer car, of a main frame; a dynamometer mechanism on said frame; a truck located under the frame having two axles, one of said axles being a driving axle; a driven shaft, gearing between the said driven shaft and the driving axle, said mechanism being at one side of the longitudinal central line of the car; clutch mechanism for coupling the driving mechanism to the shaft; a vertical operating shaft located at the side of the longitudinal center line of the car opposite to the clutch; an arm on said shaft extending towards said center line; a lever pivotally mounted on the frame of the truck and connected to the clutch mechanism, the long arm of the lever extending towards the central longitudinal line of the car; and a link connecting the long arm of the lever with the arm of the vertical operating shaft.

FREDERICK A. FLEISCHMANN.
ALPHA L. MARSH.